United States Patent [19]

Schultz et al.

[11] Patent Number: 5,174,839
[45] Date of Patent: Dec. 29, 1992

[54] DRIVE AXLE SLEEVE AND SEAL ASSEMBLY

[75] Inventors: Gary R. Schultz, Kalamazoo; Thomas L. Runels, Battle Creek; Alan R. Freigang, Zeeland; James F. Ziech, Kalamazoo, all of Mich.

[73] Assignee: Eaton Corporation, Cleveland, Ohio

[21] Appl. No.: 726,067

[22] Filed: Jul. 5, 1991

[51] Int. Cl.$^5$ ............................................. B60C 23/00
[52] U.S. Cl. ...................................... 152/415; 277/16; 277/35; 277/153; 277/70; 384/489; 301/105.1
[58] Field of Search ....................... 152/415, 416, 417; 277/16, 35, 153, 70, 59; 384/489, 152, 94; 301/105 R, 124 R

[56] References Cited

U.S. PATENT DOCUMENTS

| | | | |
|---|---|---|---|
| 2,239,676 | 4/1941 | Henry | 152/415 X |
| 2,520,306 | 8/1950 | Detweiler | 277/176 |
| 2,693,841 | 11/1954 | Webster, Jr. | 152/417 |
| 2,976,906 | 3/1961 | Kamm et al. | 152/417 |
| 3,362,452 | 1/1968 | Harnish | 152/416 |
| 3,705,614 | 12/1972 | Juttner et al. | 152/417 |
| 4,403,778 | 9/1983 | Shevokas et al. | 277/1 |
| 4,418,737 | 12/1983 | Goodell et al. | 152/416 |
| 4,470,506 | 9/1984 | Goodell et al. | 206/223 |
| 4,492,019 | 1/1985 | Wells et al. | 152/417 X |
| 4,705,090 | 11/1987 | Bartos | 152/417 |
| 4,730,656 | 3/1988 | Goodell et al. | 152/417 |
| 4,804,027 | 2/1989 | Runels | 152/417 |
| 5,080,157 | 1/1992 | Oerter | 152/417 |

Primary Examiner—Michael W. Ball
Assistant Examiner—Francis J. Lorin
Attorney, Agent, or Firm—P. S. Rulon

[57] ABSTRACT

A land vehicle wheel end assembly (16) for a rigid tubular drive axle assembly (10) includes a nonrotatable sleeve (34) interposed between a portion of a spindle (14) of the axle assembly and a wheel hub (20). The wheel hub is rotatably supported on the spindle by inboard and outboard bearings (24,26) lubricated by oil from the drive axle. The hub includes a passage for directing the oil to the inboard bearing (24). The sleeve and hub include air passages (34f, 34d, 39, 34e and 20e) for directing air from a vehicle onboard central tire inflation system to a pneumatic tire supported by the hub. A relative rotational interface between the sleeve and hub air passages is sealed by a seal assembly (52) which is lubricated by the oil. An outboard end of the sleeve preferably includes an axially open annular groove (45 or 47) for inserting an O-ring (38) seat therein after installation of the sleeve on the spindle.

9 Claims, 2 Drawing Sheets

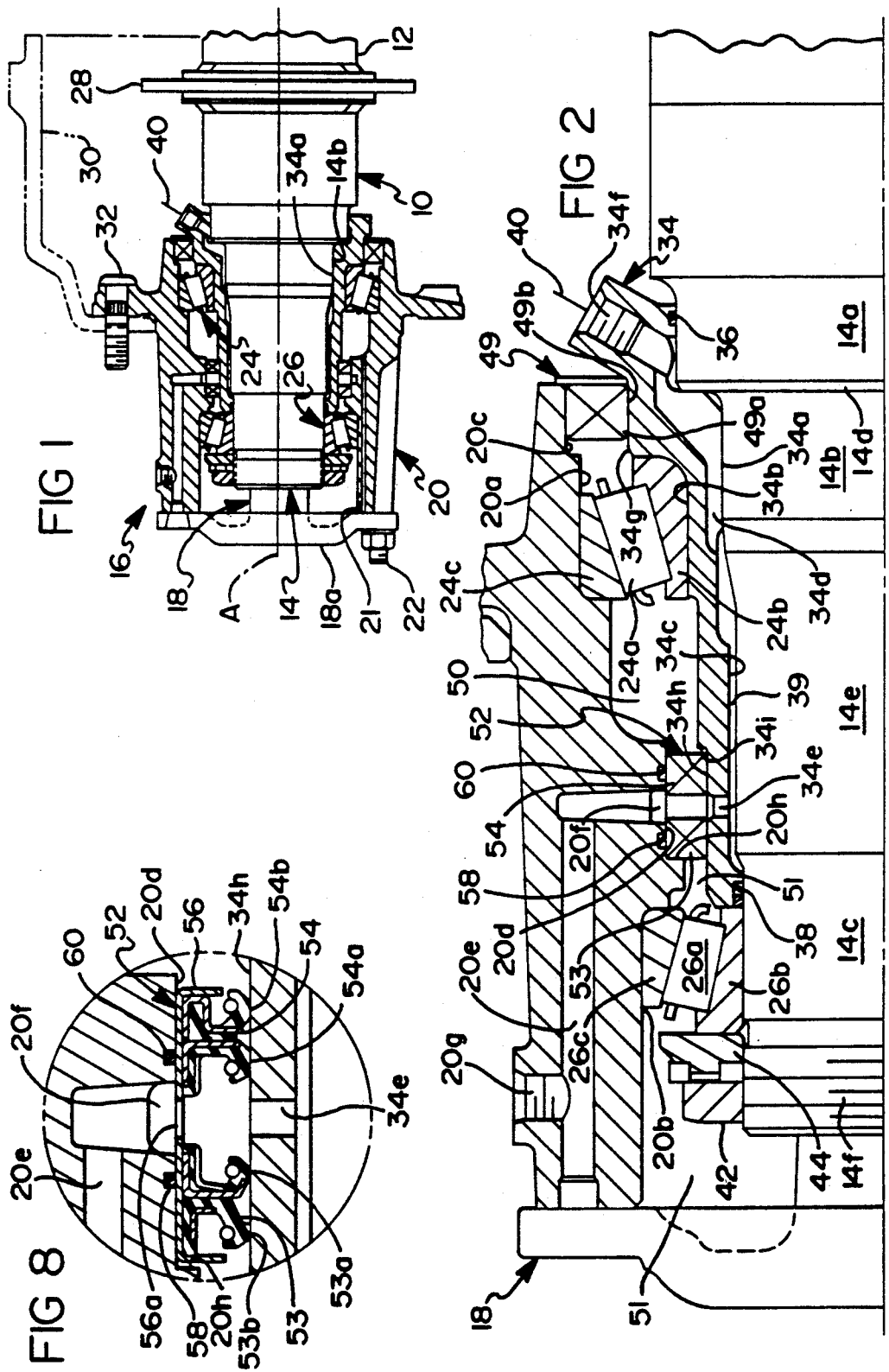

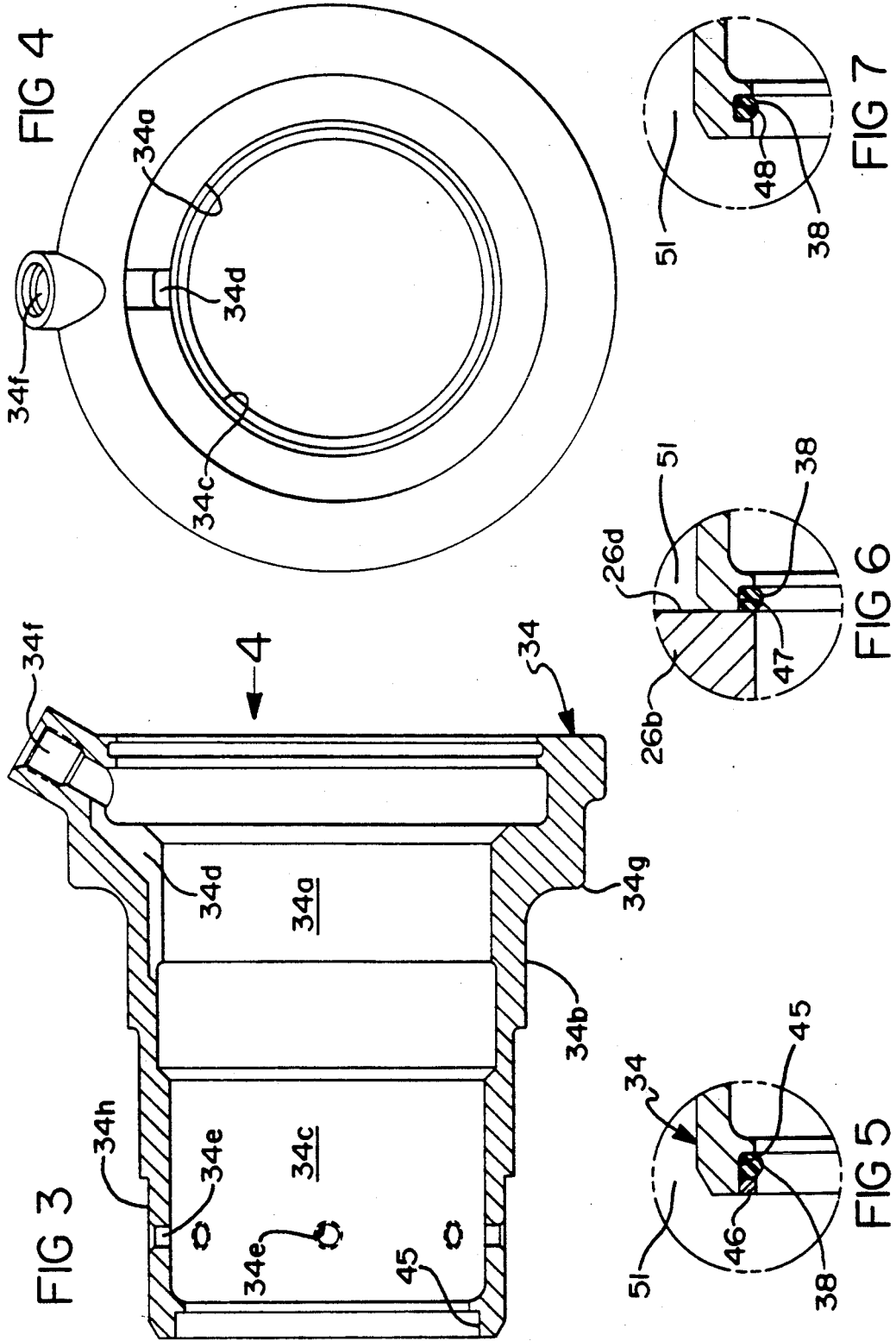

DRIVE AXLE SLEEVE AND SEAL ASSEMBLY

FIELD OF THE INVENTION

This invention relates to apparatus for transmitting air to and from tires of a drive axle for a vehicle having an onboard or central tire inflation system (CTI system). More specifically, the invention relates to a sleeve and seal assembly for transmitting the air from a nonrotatable portion of the CTI system air circuit to a wheel hub rotatably mounted on a spindle of the drive axle.

BACKGROUND OF THE INVENTION

Onboard CTI systems are known, as may be seen by reference to U.S. Pat. Nos. 4,640,331; 4,498,515; 4,898,216 and 4,917,163 which are incorporated herein by reference. Further, it is known to provide apparatus for transmitting the CTI system air from a nonrotating portion of the CTI system air circuit to a wheel hub rotatably mounted on the spindle of the drive axle, as may be seen by reference to U.S. Pat. Nos. 2,976,906; 3,362,452; 4,418,737; 4,730,656 and 4,804,027 which disclose such apparatus in detail and which are incorporated herein by reference.

The prior art apparatus of each of the above patents has certain disadvantages which are overcome by the apparatus of this invention. For example, the apparatus of this invention: requires little or not modification of a standard drive axle and is therefore ideal for retrofit applications; does not require the drilling of long passages in hardened steel components such as axle spindles or sleeves; does not require nonstandard or special wheel bearing components; positions dynamic air seals for the CTI system between the inboard and outboard bearings of each drive axle wheel hub where they are protected from dirt and grime, and are readily lubricated by the drive axle lubricating oil; avoids encroachment into the sometimes hot and always limited space for the wheel brakes; provides the CTI system with air passages of adequate flow area while maintaining the total volume thereof rather low.

SUMMARY OF THE INVENTION

An object of this invention is to provide improved apparatus for transmitting air from a nonrotatable portion of a CTI system air circuit to a wheel hub rotatably mounted on a spindle of a drive axle.

According to a feature of the invention, a vehicle drive axle assembly is adapted for use with a vehicle onboard system for controlling tire air pressure. The axle assembly comprises a rigid tubular housing including a hollow nonrotatable spindle at opposite ends thereof and a rotatable drive shaft assembly having opposite ends thereof extending through an outboard end of each spindle for driving a wheel hub rotatably supported on each spindle. Each spindle includes a radially outwardly facing surface having first, second and third surfaces concentric to an axis of the spindle and respectively of progressively lesser diameter. The first and second surfaces respectively extend from an axially outboard facing shoulder. The third surface extends axially inboard from a set of fastener threads in the outwardly facing surface at the outboard end of the spindle and axially separated from the second surface by an intermediate surface. The wheel hub is rotatably supported on the spindle by bearing means including inboard and outboard axially spaced apart bearing assemblies radially interposed between the second and third surfaces and radially inwardly facing surfaces of the hub. Each bearing has an inner and an outer race. A fastener is threadably received by the spindle fastener threads and reacts against the outboard bearing inner race for securing the hub on the spindle. A sleeve defines passage means for directing fluid pressure from a position inboard of the inboard bearing assembly to a hub passage having an opening radially aligned with a passage extending radially through a cylindrical wall of the sleeve at a position between the bearing assemblies. The sleeve includes inboard and outboard ends having means in sealing relation with the first and third surfaces, a radially inwardly facing surface sealed on the second surface, a radially outwardly facing surface supporting the inboard bearing inner race, another radially inwardly facing surface between the second and third surfaces defines an annular passage in cooperation with the spindle intermediate surface, and a groove in the sleeve inwardly facing surfaces. The groove has an outboard end communicating with the radially extending passage in the sleeve via the annular passage. The groove has an inboard end communicating with a passage in the sleeve inboard end with the passage opening into the groove inboard end at a position inboard the sleeve sealing relation with the first surface. First and second annular seals are disposed on axially opposite sides of the hub and sleeve radially extending passage and both seals are in sealing relation with radially inwardly and outwardly facing surfaces respectively of the hub and sleeve for providing a sealed annular passage between the radially extending passages.

BRIEF DESCRIPTION OF THE DRAWINGS

The apparatus of the invention is shown in the accompanying drawings in which:

FIG. 1 is a sectional view of a drive axle wheel end assembly;

FIG. 2 is an enlarged portion of the wheel end assembly in FIG. 1;

FIG. 3 is an enlarged sectional view of a sleeve in FIGS. 1 and 2;

FIG. 4 is an end view of the sleeve looking in the direction of arrow 4 in FIG. 3;

FIG. 5 is an enlarged fragmentary view of a static seal arrangement at an outboard end of the sleeve;

FIGS. 6 and 7 are alternatives to the seal arrangement of FIG. 5; and

FIG. 8 is an enlarged sectional view of dynamic air seals in FIGS. 1 and 2.

DETAILED DESCRIPTION OF THE DRAWINGS

FIG. 1 illustrates one end of a land vehicle drive axle assembly 10 including a rigid tubular housing 12 having a hollow spindle 14 disposed at each outboard end for rotatably supporting a wheel end assembly 16 driven by a drive shaft assembly 18 extending at each end through each spindle. The shaft assembly includes a flange 18a an attached to a wheel hub 20 via fasteners 22. The hub is supported for rotation about an axis A by inboard and outboard roller bearings 24, 26 of standard configuration. Bearings 24, 26 respectively include tapered rollers 24a, 26a, inner races 24b, 26b, and outer races 24c, 26c. The bearings are lubricated by the axle assembly lubricating oil which enters the wheel end assembly via clearance between the shaft assembly and the hollow spindle. A drilled passage 21 in the hub directs the oil to the inboard bearing. Each axle assembly end also includes a support flange 28 for an unshown brake mechanism which cooperates with a partially shown brake drum shown in phantom lines 30. The drum is affixed to hub 20 via studs 32 which also secure an unshown rim supporting a pneumatic tire in known manner.

Looking now mainly at FIGS. 2, 3, and 4, spindle 14 includes finished annular radially outwardly facing surfaces 14a, 14b and 14c concentric to axis A and respectively of progressively less diameter, an axially outboard facing shoulder 14d, an intermediate surface 14e, and a threaded end 14f. An annular sleeve 34 includes inboard and outboard ends having annular grooves for retaining O-ring seals 36, 38 which sealingly cooperate with spindle surfaces 14a, 14c, an annular radially inwardly facing surface 34a seated on spindle surface 14b, an annular radially outwardly facing surface 34b supporting the inboard bearing inner race 24b, a radially inwardly facing surface 34c between spindle surfaces 14b, 14c defining an annular passage 39 in cooperation with spindle intermediate surface 14e, and an air passage groove 34d in the sleeve inwardly facing surfaces. An outboard end of the groove 34d communicates with one or more radially extending passages 34e in the sleeve and an inboard end of groove 34d communicates with a passage 34f in the sleeve inboard end at a position inboard of O-ring seal 36. Passage 34f communicates with an unshown vehicle onboard central tire inflation/deflation system via a conduit 40.

Sleeve 34 is secured against axial movement relative to spindle 14 in the inboard direction via shoulder 14d and in the outboard direction via outboard bearing inner race 26b and fasteners 42, 44 threadably received by threaded end 14f of the spindle in known manner. O-ring seal 38, as also shown in enlarged FIG. 5, is preferably but not necessarily positioned in an annular axially outwardly opening groove 45 (best seen in FIG. 3) and retained in position by a ring 46 disposed between the O-ring and an axially inboard facing surface 26d of inner race 26b. Precise positioning o inner race 26b may require shims disposed between inner race surface 26d and the outboard end of the sleeve. The preferred axial opening of groove 45 facilitates installation of O-ring 38 after installation of sleeve 34 and thereby mitigates the chances of injury to the seal during installation.

Alternatively, as seen in FIG. 6, an axially open but shorter groove 47 may be employed, thereby dispensing with ring 46 and employing inner race surface 26d or the above mentioned shims to directly retain the O-ring seal. Still further, if O-ring seal injury is not a problem during sleeve installation, a conventional O-ring groove 48 may be employed as seen in FIG. 7.

Hub 20 includes radially inwardly facing surfaces including annular surfaces 20a, 20b, 20c and 20d, and an air passage 20e. Surfaces 20a, 20b support the hub on bearing outer races 24c, 26c. The inboard end of the annular space 50 between the sleeve and hub is closed by a seal 49 having an outer periphery press fit into annular surface 20c and having an inner periphery defining elastomeric lips 49a, 49b forming dynamic sealing relations with an annular surface 34b of sleeve 34. Lip 49a prevents leakage of the axle oil lubricating bearing 24 in the annular space between the sleeve and hub, and lip 49b excludes entry of dirt and grim into the annular space. Air passage 20e includes a radially extending portion having an opening 20f extending through surface 20d at a position in radial planar alignment with sleeve passages 34e and having an opening 20g for connection to an unshown pneumatic tire in any of several known manners. Leakage of air flow between passages 34e, 20e to annular spaces 50, 51 containing the bearing lubricating oil and leakage of the oil to the air passages is prevented by a seal assembly 52. The seal assembly, shown in enlarged detail in FIG. 8, includes two double lip elastomeric seals 53, 54 axially spaced apart and affixed to an annular ring member 56 in slip fit relation at its outer periphery with surface 20d. Leakage of fluid along the interface surface 20d and ring member 56 is prevented by O-ring seals 58, 60 retained in grooves in surface 20d. Ring member 56 includes one or more openings 56a for flow of air between passages 20e, 34e. Elastomeric lips 53a, 53b and 54a, 54b of seals 53 and 54 form dynamic sealing relations with an annular radially outwardly facing surface 34h of sleeve 34 and are lubricated by the oil in annular spacer 50, 51. Lips 53a, 54a prevent air leakage to the oil in annular spaces 50, 51 and may, as configured herein, move into tighter sealing relation with surface 34h in response to increasing air pressure. Lips 53b, 54b exclude entry of the oil into the air passages. Hub shoulder 20h maintains the axial positioning of seal assembly 52. Alternatively, an unshown bracket may be affixed to ring member 56 and hub 20 to retain the seal assembly against axial and rotational movement relative tot he hub.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A vehicle drive axle assembly adapted for use with a vehicle on board system for controlling tire pressure, the axle assembly comprising:

a rigid tubular housing including a hollow nonrotatable spindle at opposite ends thereof and a rotatable drive shaft assembly having opposite ends thereof extending through an outboard end of each spindle for driving a wheel hub rotatably supported on each spindle;

each spindle including a radially outwardly facing surface having first, second and third surfaces concentric to an axis of the spindle and in order of lesser diameter, the first and second surfaces extending axially outboard from an outboard facing shoulder, the third surface extending axially inboard from fastener threads in the outwardly facing surface at the outboard end of the spindle and axially separated from the second surface by an intermediate surface;

bearing means for rotatably supporting the wheel hub on the spindle, the bearing means including inboard and outboard axially spaced apart bearing assemblies radially interposed between the second surface and the outwardly facing surface at the outboard end of the spindle and radially inwardly facing surfaces of the hub, each bearing having an inner race and an outer race;

a fastener threadably received by the spindle fastener threads and reacting against the outboard bearing inner race for securing the hub on the spindle;

a sleeve defining passage means for directing fluid pressure from a position inboard the inboard bearing assembly to a hub passage having an opening radially aligned with a passage extending radially through a cylindrical wall of the sleeve at a position between the bearing assemblies;

the sleeve including inboard and outboard ends having means in sealing relations with the first and third surfaces, respectively, a first radially inwardly facing surface seated on the second surface, a radially outwardly facing surface supporting the inboard bearing inner race a second radially inwardly facing surface between the second and third spindle surfaces defining an annular passage in cooperation with the spindle intermediate surface, a groove in the first sleeve inwardly facing surface, the groove having an outboard end communicating with the radially extending passage in the sleeve via the annular passage, the groove having an inboard end communicating with a passage in the sleeve inboard end, the passage opening into the groove inboard end at a position outboard the sleeve sealing relation with the first surface; and first and second annular seals disposed on axially opposite sides of radially extending passages in the hub and sleeve with both seals in sealing relation with radially inwardly and outwardly facing surfaces respectively of the hub and sleeve for providing a sealed annular passage between the radially extending passages of the sleeve and the hub.

2. The vehicle drive axle assembly of claim 1, wherein:

the sleeve outboard end is disposed inboard of the outboard bearing inner race, and the seal means includes an annular radially inwardly open groove means having an O-ring seal therein in sealing relation with an inboard portion of the third surface.

3. The vehicle drive axle assembly of claim 2, wherein:

the annular groove means also includes an annular axially outward opening to facilitate installation of the O-ring after installation of the sleeve on the spindle.

4. The vehicle drive axle assembly of claim 3, wherein:

an axially inboard facing surface of the outboard bearing inner race maintains the O-ring in the annular groove.

5. The vehicle drive axle assembly of claim 3, wherein:

the seal means includes an annular ring received by the annular axially outward opening and sandwiched between the O-ring and an axially inboard facing surface of the outboard bearing in race.

6. The vehicle drive axle assembly of claim 1, wherein:

the first and second annular seals include annular lip portions in dynamic sealing relation with the outwardly facing surface of the sleeve and include support means in static sealing relation with the hub inwardly facing surface.

7. The vehicle drive axle assembly of claim 6, wherein:

the seal support means includes an annular ring member having the seals affixed to a radially inwardly facing surface thereof, having a radially outwardly facing surface thereof in the static sealing relation, and having a radially extending opening therein for communicating the hub passage with the annular passage defined by the seals.

8. The vehicle drive axle assembly of claim 1, further including:

lubricating means for lubricating the inboard and onboard bearings with oil from the rigid tubular housing, the lubricating means including an oil passage in the hub for directing the oil from a position outboard of the outboard bearing assembly tot he inboard bearing assembly.

9. The vehicle drive axle assembly of claim 8, wherein:

the first and second annular seals each include a first and second annular lip potions in dynamic sealing relation with the outwardly facing surface of the sleeve the first lips for preventing leakage of the air flowing between the radially extending passages in the hub and sleeve, and the second lips lubricated by the oil and preventing leaking of oil to the passages.

* * * * *